(12) United States Patent
Burgstaler et al.

(10) Patent No.: US 7,441,478 B2
(45) Date of Patent: Oct. 28, 2008

(54) PEDAL WITH FASTENING CLIP FOR PUSH ROD

(75) Inventors: Andree Burgstaler, Dielingen (DE); Jan Dütz, Damme (DE); Wolfgang Meyer, Osnabrück (DE); Simone Papke, Osnabrück (DE)

(73) Assignee: ZF Boge Elastmetall GmbH, Damme (DE)

( * ) Notice: Subject to any disclaimer, the term of this patent is extended or adjusted under 35 U.S.C. 154(b) by 39 days.

(21) Appl. No.: 11/174,838

(22) Filed: Jul. 5, 2005

(65) Prior Publication Data

US 2005/0241473 A1 Nov. 3, 2005

Related U.S. Application Data

(63) Continuation of application No. PCT/DE2004/001311, filed on Jun. 23, 2004.

(30) Foreign Application Priority Data

Jun. 24, 2003 (DE) ............... 103 28 542

(51) Int. Cl.
*G05G 1/30* (2008.04)
(52) U.S. Cl. .......... 74/512; 248/200
(58) Field of Classification Search ............ 74/512, 74/513, 560, 562; 277/591, 598, 628, 637; 180/274, 315, 335; 248/200; 91/376 R; *B60T 7/06; G05G 1/14*
See application file for complete search history.

(56) References Cited

U.S. PATENT DOCUMENTS 7,059,213 B2 * 6/2006 Burgstaler et al. ............ 74/512

2005/0039597 A1 * 2/2005 Vermoesen ............... 91/376 R

FOREIGN PATENT DOCUMENTS

| DE | 101 56 987 A1 | | 6/2003 |
|----|---|---|---|
| EP | 0 229 350 B1 | | 7/1987 |
| EP | 0 430 600 A1 | * | 6/1991 |
| EP | 0 896 162 A1 | | 2/1999 |
| EP | 1 378 409 A1 | * | 1/2004 |
| EP | 1 391 361 A1 | | 2/2004 |
| FR | 2 878 803 | * | 6/2006 |
| WO | WO 00/68050 | * | 11/2000 |

OTHER PUBLICATIONS

PTO 07-5118 Translation of DE 101 56 987 A1, Alonso et al., Jun. 5, 2003, USPTO, STIC Library.*

* cited by examiner

*Primary Examiner*—Vinh T. Luong
(74) *Attorney, Agent, or Firm*—McGlew & Tuttle, P.C.

(57) ABSTRACT

A snap connection is provided between a push rod, e.g., of brakes, to an actuating element, e.g., a brake pedal. A fastening clip (2) is detachably fastened to the pedal. The push rod includes a spherical end (10) which can be held in an articulated manner by the fastening clip (2) for transmitting actuating forces. The interior of the fastening clip has two elastically deformable locking lips (4) acting as barbs, which fix the spherical end of the push rod (10) in the pedal (1) after the insertion of the push rod (10) into the fastening clip (2). The fastening clip (2) is preferably a plastic part with essentially closed sides, which are closed off on the pedal side by a front surface with an opening for the spherical end of the push rod. The opening has an insertion area (13) for inserting the spherical end of the push rod (10) and a removal area (14) for removing the push rod (9).

19 Claims, 4 Drawing Sheets

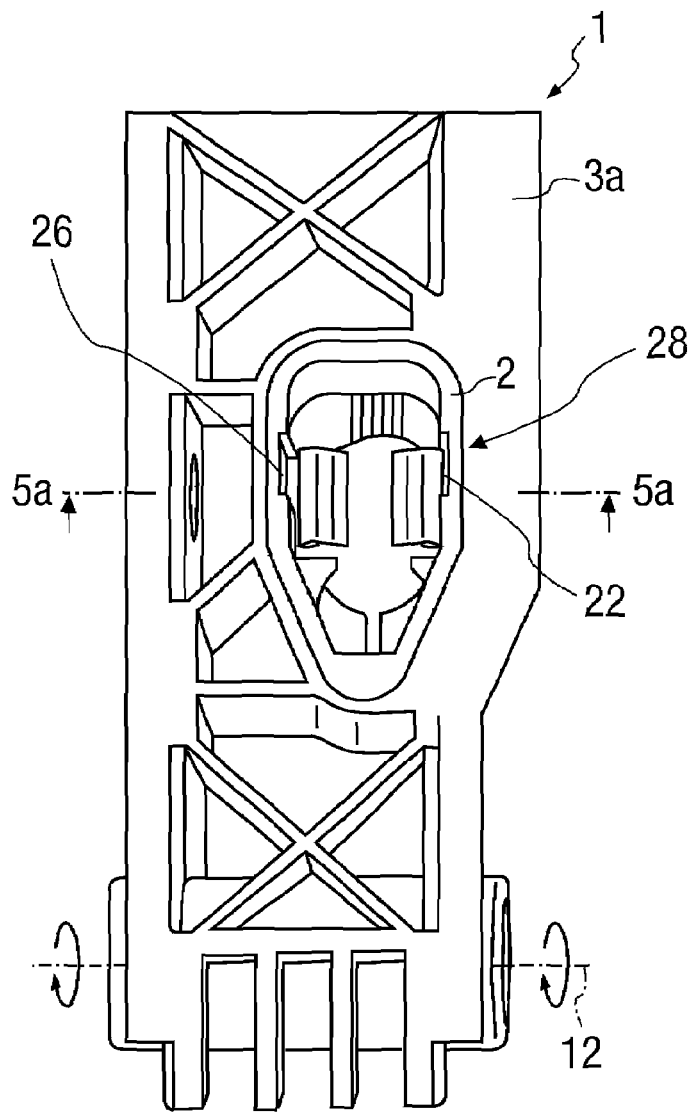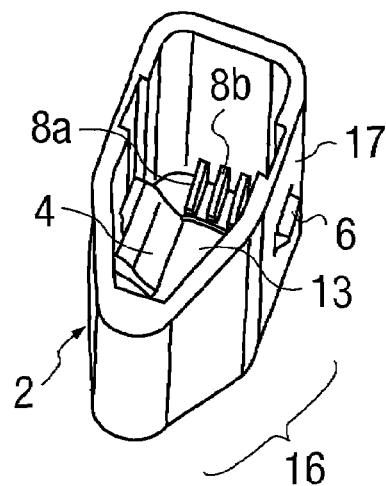
Fig. 1c
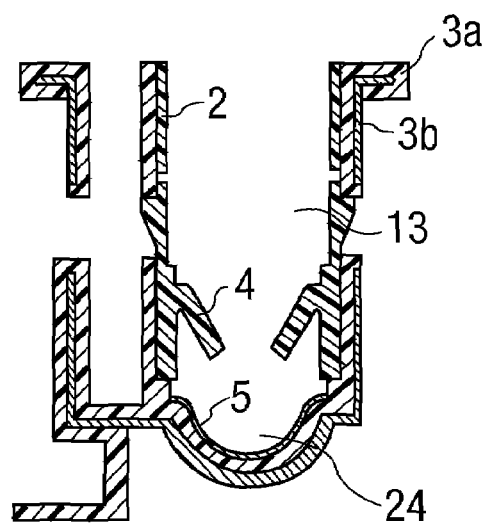
Fig. 1a
Fig. 1b

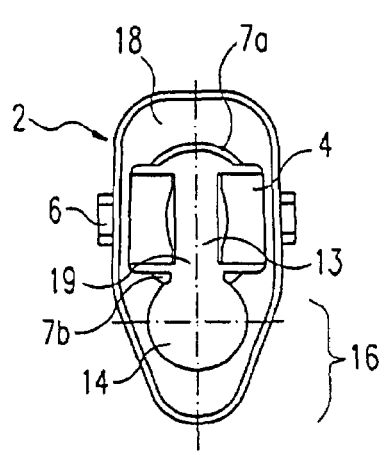
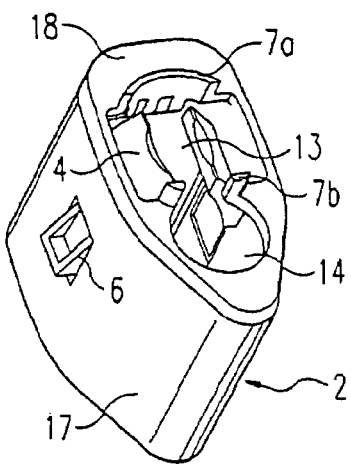
Fig. 2a                Fig. 2b
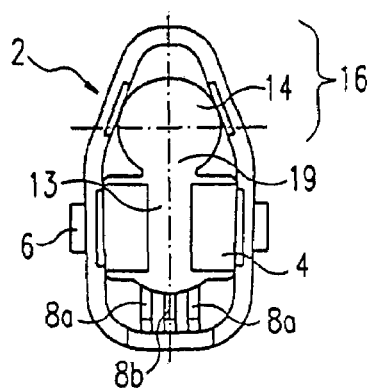
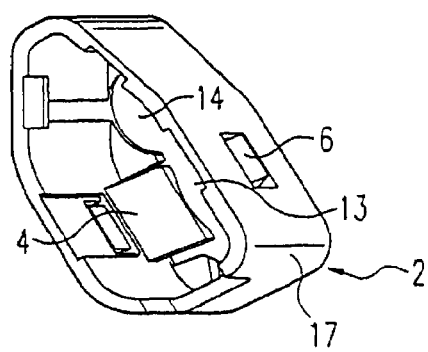
Fig. 3a                Fig. 3b
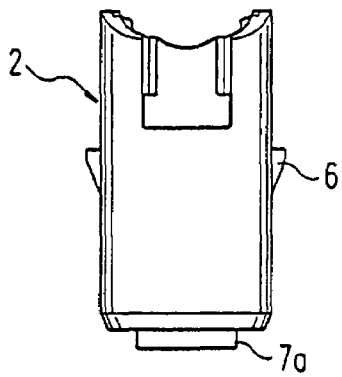
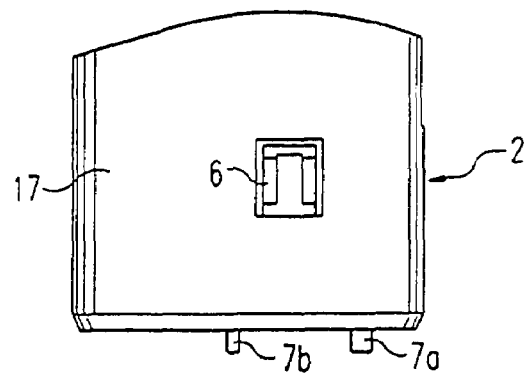
Fig. 4a                Fig. 4b

PEDAL WITH FASTENING CLIP FOR PUSH ROD

CROSS REFERENCE TO RELATED APPLICATION

This is a continuation of, and claims the benefit (35 U.S.C. §120 and 365(c)) of, copending International Application PCT/DE2004/001311 of 23 Jun. 2004, which designated inter alia the United States and which claims the priority of German Application 103 28 542.3 of 24 Jun. 2003. The entire contents of each application is hereby incorporated by reference in its entirety.

FIELD OF THE INVENTION

The present invention pertains to a fastening device in a motor vehicle. The present invention pertains, in particular, to a snap connection with which a push rod, e.g., of brake devices, is fastened to an actuating means, e.g., a brake pedal.

BACKGROUND OF THE INVENTION

It is often necessary in the construction of vehicles to movably couple functional elements in the front area of the vehicle (brake servo unit cylinder, clutch, throttle flap, etc.) with the corresponding actuating means in the passenger compartment (brake pedal, clutch pedal, gas pedal, etc.). Such a mechanical connection is usually established, especially in case of the brake pedal, by a push rod, which may be fastened in many different ways on the pedal side. These include fork and bolt connections, spindle nut-like connections, snap connections, etc. The connection is established at a comparatively poorly accessible point and can be brought about, as a rule, only manually.

Thus, a snap connection is provided in the patent specification known from EP 0 229 350 B1, in which the pedal has a bushing, in which the pin-shaped or spherical end of the push rod can be held nearly without clearance. The bushing as such represents an undercut, into which the pin-shaped or spherical end fastened to the push rod can be pushed. The bushing has a funnel-shaped insertion area and is in turn integrated in an insert part, which can be snapped into a mounting part of the pedal.

By contrast, the articulated connection between the push rod and the brake pedal in the actuating device known from EP 0 896 162 A1 is established by a fastening device, in which the ball head of the push rod is held by two hooks during movements opposite the direction of actuation. The ball head is supported in a bearing shell during the actuation of the pedal. Both hooks are part of an annular plastic insert, which can in turn be snapped into an insert part of the pedal and is open on one side, so that the end of the push rod can be removed through this opening at right angles to the axis of the push rod in the non-installed state of the insert.

Fastening devices especially of the type mentioned last have the drawback that, on the one hand, the lateral snap hooks or the pedal-side hooks corresponding to them become blunt and lose their hooking property or even break off in case of frequent removal of the plastic insert. On the other hand, the plastic insert does not have the maximum strength that would be desirable even in the installed state at right angles to the axis of the push rod because of its removal opening. Even buckling of the insert would be possible on the side located opposite the opening under a corresponding (lateral) load, which can lead to an undesirable breaking off of the insert part in the worst case. The insert part may also be unintentionally twisted and damaged during nonuniform opening of the snap hooks or during nonuniform removal because of the removal opening.

SUMMARY OF THE INVENTION

One basic object of the present invention is to further improve a fastening device of pedal with an insert for connecting to a push rod, especially with a design such that maximum strength of the device is guaranteed, on the one hand, and, on the other hand, the wide variety of parts is reduced.

What is claimed according to the present invention is a pedal for a motor vehicle with a fastening clip fastened detachably to the pedal, in which a spherical end of a push rod for transmitting actuating forces can be held in an articulated manner, wherein the interior of the fastening clip has two pivotable locking lips, which act as barbs and fix the spherical end of the push rod in the pedal after the push rod has been inserted into the fastening clip. According to the present invention, the fastening clip is a plastic part with essentially closed sides, which are closed off on the pedal side by a front surface with an opening for the spherical end of the push rod, wherein the opening has an insertion area for inserting the spherical end of the push rod and a removal area for removing the push rod.

A keyhole-shaped pedal-side opening, which has a rectangular area and a round area adjoining same, is advantageous from the viewpoint of construction. Since the locking lips are advantageously of a rectangular shape and protrude into the insertion area, the rectangular area of the keyhole-shaped opening forms the insertion area and the round area forms the removal area.

To hold the fastening clip in a stable manner in the pedal even under tensile force, the clip has, on opposite sides, two snap hooks integrated in the sides, which snap into corresponding recesses in the fastening clip mount of the pedal and detachably fix the fastening clip in the pedal.

The fastening clip advantageously has reinforcing ribs in the insertion area, which have a beveled funnel shape. These represent as such an insertion aid, which facilitate the blind insertion of the push rod into the insertion area and finally into the bearing shell.

Concerning the nature of its material, the pedal is made according to the present invention as a two-component pedal made as a plastic part, which is reinforced with metal. Because of the high stability of such a hybrid design of the pedal, it is possible to directly anchor the fastening clip in the pedal without having to use a shell, which has hitherto been common, as a pedal module. The wide variety of parts of the actuating means is reduced as a result.

Furthermore, the fastening clip mount of the pedal has a pin, which protrudes into the removal opening in the installed state of the fastening clip. Due to its funnel shape, it is just as the reinforcing ribs) an insertion aid with the advantages associated therewith.

The fastening clip ultimately fixes in the fastening clip mount of the pedal a bearing shell, which is advantageously backed with a material or advantageously consists itself of a material that has such an elasticity that it presses the spherical end against the locking lips after the insertion and locking of the spherical end of the push rod by the locking lips. Clearance-free fixation of the spherical end of the push rod in the bearing shell can be brought about in this manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 1a is a view of the hybrid brake pedal according to the present invention on the push rod side with the fastening clip according to the present invention snapped in and without the push rod;

FIG. 1b is a cross sectional view of the fastening clip according to the present invention;

FIG. 1c is a perspective view of the fastening clip according to the present invention on the push rod side;

FIG. 2a is a pedal-side top view of the fastening clip according to the present invention;

FIG. 2b is a pedal-side perspective view of the fastening clip according to the present invention;

FIG. 3a is a push rod-side top view of the fastening clip according to the present invention;

FIG. 3b is a push rod-side perspective view of the fastening clip according to the present invention;

FIG. 4a is a rear view of the fastening clip according to the present invention;

FIG. 4b is a side view of the fastening clip according to the present invention;

DESCRIPTION OF THE PREFERRED EMBODIMENT

Figure 5A:
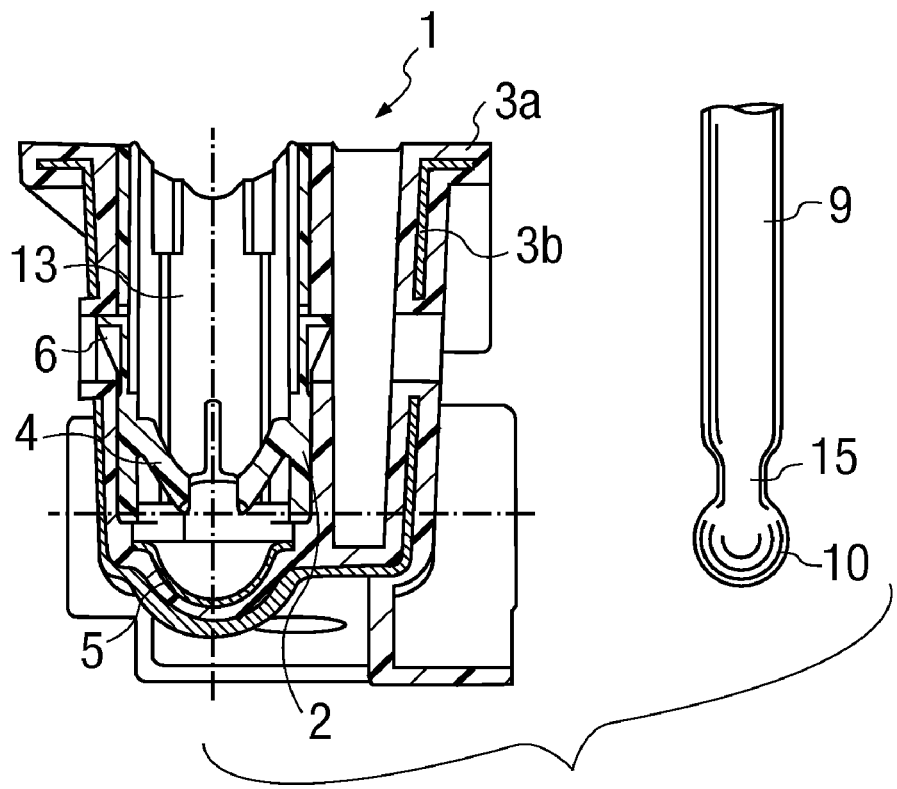
FIG. 5a is a sectional view along line 5a-5a from FIG. 1a through the hybrid brake pedal according to the present invention with the fastening clip snapped in at the level of the bearing shell and the locking lips with the push rod not installed.

Referring to the drawings, FIG. 1a shows on the push rod side the hybrid brake pedal 1 according to the present invention with the fastening clip (connector) 2 according to the present invention snapped in and without the push rod. The pedal is mounted rotatably about an axis 12 and can be pivoted by the driver. In this way the pivoting movement of the pedal is converted into an axial movement of the push rod with the push rod installed in the fastening clip according to the present invention. The brake servo unit cylinder in the front area of the vehicle is thus mechanically acted on. The fastening clip 2 according to the present invention is snapped approximately at half-height of the pedal 1 into the plastic section (connector receiving means) 3a (see FIG. 5a: Section 5a-5a). The designation "hybrid" stems from the fact that the plastic section 3a proper of the brake pedal is reinforced with a metal structure 3b, i.e., the pedal consists of two different material components. The metal structure 3b comprises sheet metal parts (pieces of sheet metal), which are usually cast with or in the plastic already at the time of the manufacture of the pedal 1.

As was already noted in the description of the state of the art, the push rod is usually connected with the pedal at a point that is comparatively poorly accessible and is poorly visible. Therefore, the fastening clip according to the present invention has, according to FIG. 1c, a middle reinforcing rib 8b at the edge of the insertion area 13 and two lateral reinforcing ribs 8a located adjacent to the middle reinforcing rib. The ball head 10 slides through these reinforcing ribs 8a, 8b into the bearing shell 5 during the insertion of the push rod 9 into the rear part of the fastening clip (insertion area 13). The shape of the fastening clip 2 as well as the connection thereof with the pedal 1 will be explained in greater detail below.

FIG. 2a shows a pedal-side top view of the fastening clip 2 according to the present invention. For better understanding, FIG. 2b shows a pedal-side perspective view of the fastening clip 2 according to the present invention. The fastening clip 2 according to the present invention is a plastic part with essentially closed sides 17, which are closed by a front surface 18 on the pedal side to form a closed ring structure. The front surface 18 has an opening 19 with an insertion area (first opening region) 13 for inserting the spherical end 10 of the push rod 9 as well as a removal area 14 for removing the push rod 9. On a side of the side 17, the plastic part has a wedge-shaped expansion 16. As is illustrated especially by the perspective view, the opening 19 in the front surface 18 is keyhole-shaped. The rear (rectangular) part of the opening 19 forms the insertion area 13, which has laterally both (likewise rectangular) locking lips 4 in the interior of the fastening clip. The locking being elastically deformable, for example, during the insertion of the head of the push rod. The front, circular part of the opening 19 is the removal area (second opening region) 14 of the fastening clip 2. In the removed state of the fastening clip, the ball head 10 of the push rod 9 (which is still being held by the locking lips 4 in the insertion area 13) can be displaced laterally into the removal area 14 and removed.

The entire fastening clip 2 is positioned in a contour of the hybrid brake pedal 1, which is intended for this purpose, and the fastening clip is fixed by means of two snap hooks (connection means) 6, which are laterally integrated in the cylinder wall and must again be pressed in for subsequent removal of the fastening clip 2. The snap hooks 6 snap into corresponding recesses 22, 26 in the fastening clip mount 28 of the pedal and detachably fix the fastening clip in the pedal. However, the bearing shell 5 must first be placed into a recess 24 of the pedal 1 provided specifically for this purpose before the fastening clip 2 is inserted. When the fastening clip 2 is installed in the pedal 1, the bearing shell 5 is fixed in the recess 24 by a rear web 7a as well as two front webs 7b, which project from the top side of the fastening clip 2.

FIG. 3a shows a push rod-side top view of the fastening clip 2 according to the present invention. A push rod-side perspective view of the fastening clip 2 according to the present invention is again shown in FIG. 3b for better understanding. The middle reinforcing rib 8b and two lateral reinforcing ribs 8a located adjacent to the middle reinforcing rib 8b can be seen at the edge of the insertion area 13 on the opposite side of the front side of the surface 17. As was already described above, the reinforcing ribs are beveled in order to facilitate the insertion of the push rod 9.

FIG. 4a shows the rear view of the fastening clip 2 according to the present invention, in which both snap hooks 6 project laterally from the cylinder wall. The snap hooks guaranteeing the fixation of the fastening clip 2 in the pedal 1. The rear web 7a fixing the bearing shell 5 can be recognized in the lower area. Both webs (rear web 7a as well as front web 7b) can be recognized in FIG. 4b, which a side view of the fastening clip 2 according to the present invention.

FIG. 5a shows a cross section through the hybrid brake pedal 1 according to the present invention with the fastening clip 2 snapped in at the level of the bearing shell 5 with the locking lips 4, and with the push rod 9 not installed. The push rod 9 is shown on the right-hand side of FIG. 5a. The pedal-side end of the push rod 9 has a ball head-shaped design. The spherical head 10 (ball head) of the push rod 9 is inserted into the insertion area 13 and pressed against the bearing shell 5. The push rod has a contraction in area 15 between the ball head 10 and the rod 9. This is necessary to make it possible to hold the ball head 10 in the bearing shell 5 with the locking lips 4 in the installed state. Far greater mechanical stability of the pedal is obtained due to the hybrid structure according to the present invention (plastic profile 3a, metal reinforcement 3b) than in case of conventional plastic pedals.

Figure 5B:
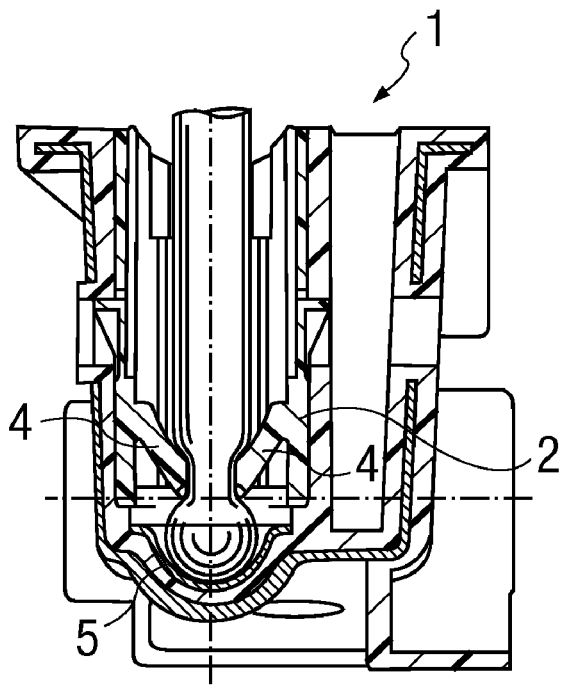
FIG. 5b is a cross section through the hybrid brake pedal according to the present invention with the fastening clip snapped in at the level of the bearing shell and the locking lips with the push rod installed.

The installed state of the push rod 9 is shown in FIG. 5b. The push rod 9 is in the insertion area 13. Both locking lips 4 fix the push rod 9 in the area of their contraction in area 15, so that an axial yielding of the ball head 10 and consequently of the push rod 9 is prevented from occurring.

Because of the mechanics of this locking mechanism, more precisely because of the pivoting radius of the locking lip 4, the ball head 10 of the push rod 9 must be inserted more deeply than the axial space it actually needs between the bearing shell 5 and the locking lip 4 in the firmly locked state. This would cause the ball head 10 to still have a certain clearance between the locking lips 4 and the bearing shell 5 in the locked state.

To prevent this, the bearing shell 5 may either be manufactured in an embodiment according to the present invention from a material that is still wear-resistant but is, in particular, elastic, or be backed with a correspondingly elastic material, so that the ball head 10 can be pressed into the bearing shell 5 (and is pretensioned) until the locking lips 4 can come to lie around the contraction in area 15 thereof After locking, the push rod 9 is then able to yield because of the pretension, but it can do so only to the extent that corresponds to the elasticity of the bearing shell 5. The ball head 10 can thus be locked without clearance.

Figure 6A:
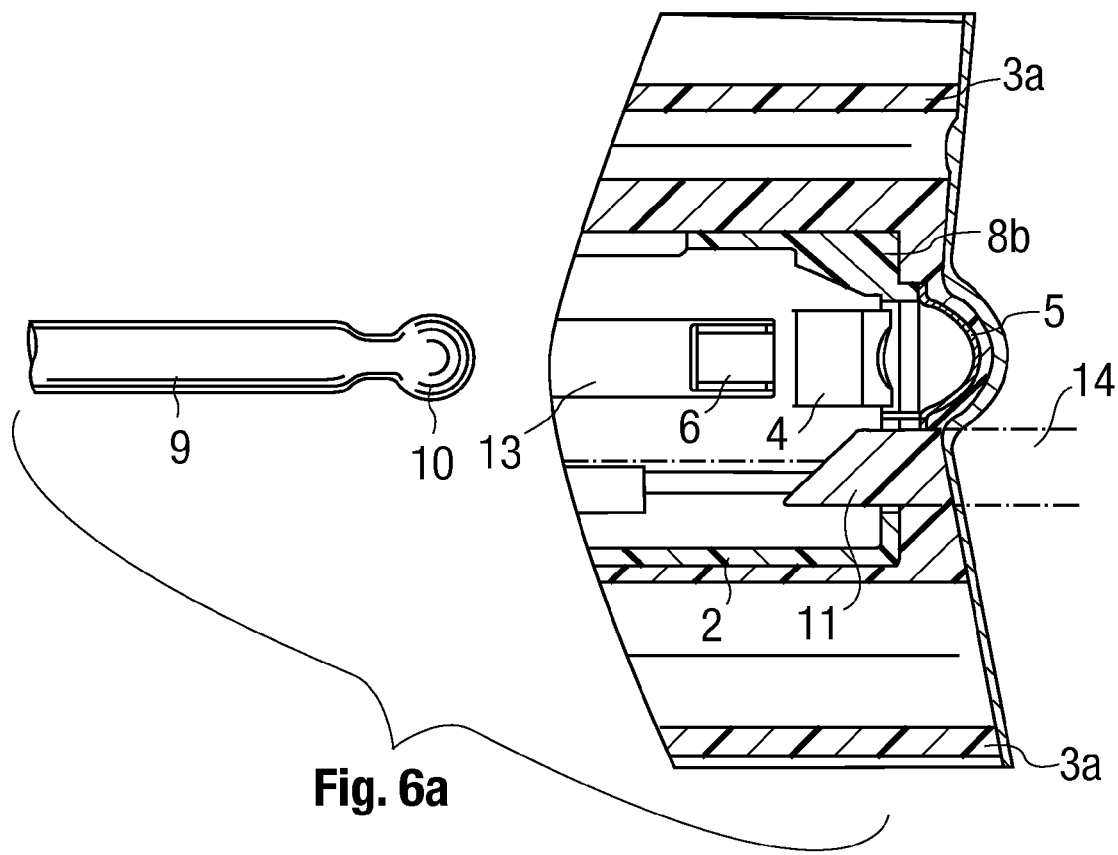
FIG. 6a is a detail of a longitudinal section through the hybrid brake pedal according to the present invention with the fastening clip according to the present invention snapped in at the level of the middle reinforcing rib with the push rod not installed.

FIG. 6a shows a longitudinal section through the hybrid brake pedal 1, with the fastening clip 2 snapped in, at the level of the middle reinforcing rib 8b with the push rod 9 not installed. The hatched area shows both the plastic area 3a of the hybrid brake pedal 1 and that of the fastening clip 2 according to the present invention. The central part in this view is the locking lip 4, which has, on the bearing shell side, a radial bevel, which is located around the contraction in area 15 of the push rod 9 in a cuff-like manner in the locked state and guarantees a more stable fixation than it would occur in case of a straight edge. The locking lip 4 is located in the insertion area 13, and the bearing shell 5 is arranged at the same level. The snap hook 6 can also be recognized. The push rod 9 shown is located, according to FIG. 6a, outside the pedal, but is shown at the level of the insertion area 13, namely, the position in which it is ultimately inserted. To facilitate the insertion of the push rod 9, the reinforcing ribs 8a and 8b each show a bevel, which brings about a funnel-shaped narrowing at least on one side of the insertion area 13. On the opposite side of the reinforcing rib 8b—in the removal area 14—a pin-shaped part 11 of the brake pedal 1 protrudes into the fastening clip 2. This pin 11 is beveled in a funnel-shaped manner and thus represents an additional insertion aid as it forces the push rod 9 into the center of the insertion area 13 and thus prevents the ball head 10 from being moved into the removal area 14 during the insertion.

Figure 6B:
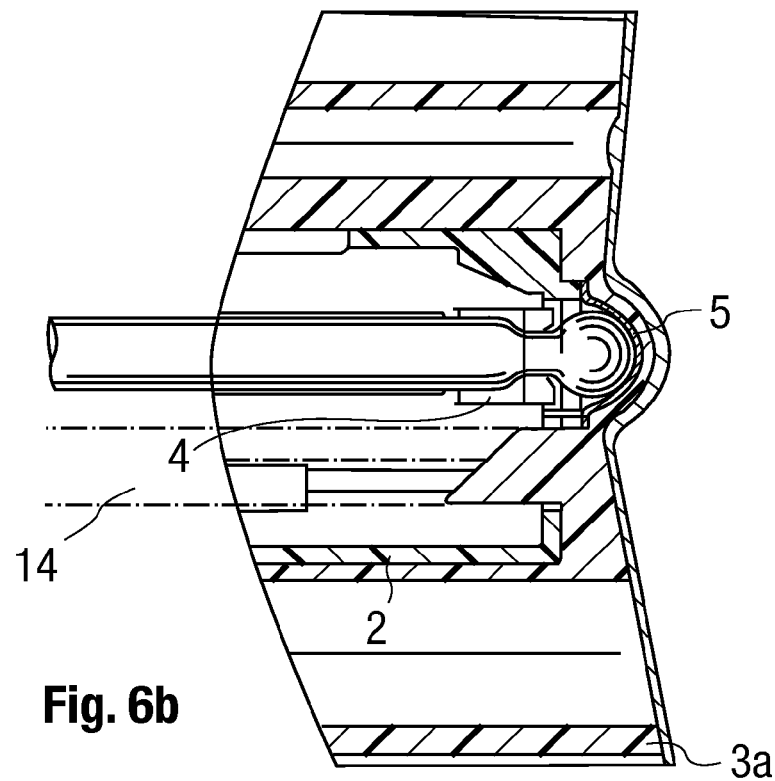
FIG. 6b is a detail of a longitudinal section through the hybrid brake pedal according to the present invention with the fastening clip according to the present invention snapped in at the level of the middle reinforcing rib with the push rod installed.

The installed state of the push rod 9 in the fastening clip 2 according to the present invention is fixed in the pedal is shown in FIG. 6b. The longitudinal section through the hybrid brake pedal 1, with the fastening clip 2 snapped in at the level of the middle reinforcing rib 8b, shows how the ball head 10 of the push rod 9 is held without clearance between the locking lip 4 and the bearing shell 5.

While a specific embodiment of the invention has been shown and described in detail to illustrate the application of the principles of the invention, it will be understood that the invention may be embodied otherwise without departing from such principles.

What is claimed is:

1. A pedal arrangement for a motor vehicle, the arrangement comprising:
   a pedal including a fastening clip mount having a pin;
   a fastening clip detachably fastened to said pedal, said fastening clip being shaped to hold a spherical end of a push rod in an articulated manner for transmitting actuating forces, said fastening clip having an interior with two elastically deformable locking lips acting as barbs, said fastening clip being formed of plastic with continuous side walls defining continuously close sides, said sides being closed off on a pedal side of said fastening clip by an annular front surface defining a first opening and a second opening, said annular front surface extending fully around said first opening and a second opening, said first opening defining an insertion area opening for the spherical end of the push rod, said second opening defining a removal area opening for removing the push rod, said barbs extending into said insertion area opening and fixing the spherical end of the push rod in said pedal after insertion of the push rod into said fastening clip, said removal area opening being adjacent to said insertion area opening, said pin protruding into said removal area opening when said fastening clip is connected to said fastening clip.

2. An arrangement in accordance with claim 1, wherein said first opening and said second opening define a pedal-side opening, said pedal-side opening being keyhole-shaped and having a rectangular area and a round area adjoining said rectangular area.

3. An arrangement in accordance with claim 2, wherein:
   said round area of said opening forms said removal area and said rectangular area of said opening forms said insertion area.

4. An arrangement in accordance with claim 1, wherein said fastening clip has, on opposite sides, two snap hooks integrated in said opposite sides, said fastening clip mount defining recesses, said two snap hooks snap into said recesses in said fastening clip mount of said pedal and detachably fix said fastening clip in said pedal.

5. An arrangement in accordance with claim 1, wherein:
   said fastening clip has reinforcing ribs in said insertion area.

6. An arrangement in accordance with claim 5, wherein:
   said reinforcing ribs are beveled in a funnel-shaped manner and form an insertion aid.

7. An arrangement in accordance with claim 1, wherein:
   said pedal includes a plastic part including an integrated metal reinforcement.

8. An arrangement in accordance with claim 1, wherein:
   said pin is funnel-shaped pin.

9. An arrangement in accordance with claim 1, wherein:
   a bearing shell is arranged on said pedal;

said pedal defines a contour receiving said bearing shell;
said fastening clip fixes said bearing shell in said contour of said pedal.

10. An arrangement in accordance with claim 9, wherein:
said bearing shell is backed with a material or said bearing shell includes a material that has such an elasticity that the spherical end of the push rod is fixed in said bearing shell without clearance.

11. An arrangement in accordance with claim 9, wherein said bearing shell is fixed in a recess via a rear web and two front webs, said rear web and said two front webs extending from a top side of said fastening clip.

12. A pedal arrangement for a push rod with a spherical head, the arrangement comprising:
a pedal including a pin;
a fastening clip fastened to one side of said pedal, said fastening clip having a pedal side arranged adjacent said one of said pedal, said fastening clip having continuous side walls, one side wall being continuously connected to another side wall to define an integral closed side structure, said closed side structure defining a cavity, said cavity extending through said pedal side to form a closed opening, said closed side structure defining a closed contour completely surrounding said cavity, said closed side structure being connected to a front annular surface of said fastening clip, said front annular surface defining a first opening in communication with said cavity and a second opening in communication with said cavity, said first opening defining a rod insertion area and said second opening defining a rod removal area, said rod insertion area being shaped to include barbs for blocking removal of the spherical end of the push rod away from said pedal, said rod removal area being shaped for passage of the spherical head away from said pedal and out of said fastening clip, said rod insertion area and said rod removal area being in communication with each other, said pin being arranged to protrude into said rod removal area when said fastening clip is mounted on said pedal and to block movement of the push rod removal area.

13. An arrangement in accordance with claim 12, wherein said first opening and said second opening of said fastening clip closed on a side of said fastening clip substantially perpendicular to a plane of said one side of said pedal.

14. An arrangement in accordance with claim 12, wherein said closed side structure is closed off on a pedal side of said fastening clip by a front surface, said closed contour extending from said front surface to form an exterior surface of said fastening clip.

15. An arrangement in accordance with claim 12, wherein said pedal-side opening is keyhole-shaped and has a rectangular area and a round area adjoining said rectangular area, said round area of said opening forming said removal area and said rectangular area of said opening forming said insertion area, said closed contour completely surrounding said round area and said rectangular area.

16. A pedal arrangement comprising:
a pedal including a connector mount with a funnel-shaped pin;
a connector receiving means arranged at a connector receiving means location of said pedal;
a connector having barbs and a continuous annular wall to form a continuously closed ring, said closed ring defining an opening;
a connection means provided on said connector, said connection means being detachably connected to said connection receiving means at said connector receiving means location;
a rod extending within said opening from a side barbs extending therein, said closed ring enclosing a second opening region, said first opening region and said second opening region being shaped for positioning said rod at said connector receiving means location, said first opening region and said second opening region being in communication with said opening, said first opening region being in communication with said first opening region, said pin being arranged to protrude into said second opening region in an installed state of said connector.

17. A pedal arrangement in accordance with claim 16, wherein said pedal is a integral structure including said connection receiving means and said connection receiving means location.

18. A pedal arrangement in accordance with claim 16, wherein said connector has reinforcing ribs arranged in said insertion area.

19. A pedal arrangement in accordance with claim 16, wherein:
a bearing shell is arranged on said pedal;
said pedal defines a contour receiving said shell;
said connector fixes said bearing shell in said contour of said pedal.

* * * * *